May 2, 1933. A. O. ABBOTT, JR 1,906,502

APPARATUS FOR THE MANUFACTURE OF TIRES

Original Filed May 14, 1924

Inventor
Adrian O. Abbott, Jr.
By Walter S. Tipes
Attorney

Patented May 2, 1933

1,906,502

UNITED STATES PATENT OFFICE

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN

APPARATUS FOR THE MANUFACTURE OF TIRES

Continuation of application Serial No. 713,118, filed May 14, 1924. This application filed June 28, 1929.
Serial No. 374,323.

This invention relates to the art of manufacturing pneumatic tires and more particularly to an apparatus useful in that art.

This case is a continuation of my application Serial No. 713,118, filed May 14, 1924, for method and apparatus for use in the manufacture of tire casings.

In manufacturing pneumatic tires, the constituents of the tire may be built into an endless band of the tire elements. Such endless band of tire elements must then be shaped into the form of a tire casing and cured. The casing is cured under internal pressure which may be fluid pressure directly in contact with the inner walls of the casing or which may be created by a deformable bag insertible within the tire casing and having a cavity into which fluid under pressure may be introduced. Such a bag is commonly known as a curing bag.

Heretofore it has been usual to shape the endless band of tire elements into tire shape by the use of a suitable apparatus such as that disclosed in my Patent 1,507,563, Sept. 9, 1924. After shaping the endless band into tire form it has been usual to remove it from the shaping apparatus and place it in a mold and apply bead rings thereto. It has been usual to insert a curing bag into the shaped casing either while it is in the shaping apparatus or after removal therefrom. The bead rings have the function of clamping the edge portions of the tire casing closely about the curing bag so as to confine the bag within the casing.

It is the object of this invention to provide a novel method of shaping an endless band of tire elements into tire form and applying bead rings thereto. It is also the object of my invention is to provide a novel method for shaping an endless band of tire elements into tire form, introducing a curing bag thereinto and applying bead rings thereon. It is also the object of my invention to provide a novel apparatus for shaping an endless band into tire form and for applying bead rings to the band while the same is held in tire form. Other objects and advantages of the present invention will appear from the following detailed description taken in connection with the accompanying drawing.

Figure 1:
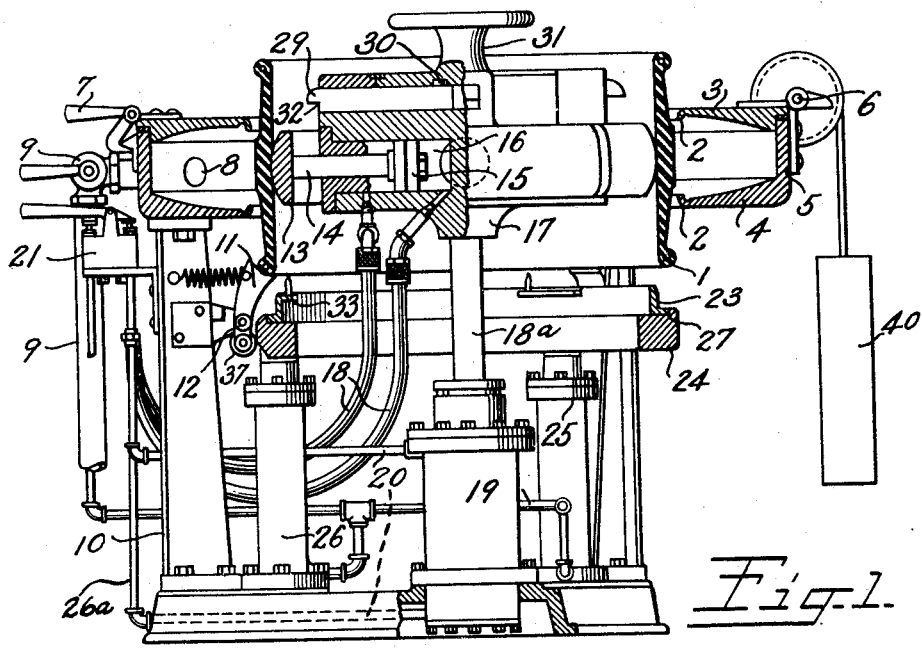
Fig. 1 is a vertical central section of my novel apparatus.
Figure 2:
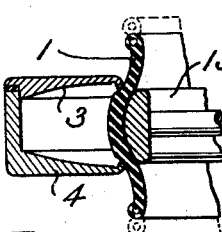
Figs. 2, 3, 4, 5 and 6 are detailed sectional views illustrating different stages in the operation of the machine of this invention.

An endless band of tire building material constructed in the customary manner and such as shown at 1 is introduced into circular apertures 2 provided in the top and bottom walls 3 and 4 respectively of a tire shaping device of the type known as a suction box or vacuum box. An annular wall 5 which may or may not be integral with either of the top or bottom walls is provided. In the present instance, the top wall 3 is hingedly mounted on the side wall 5 as indicated at 6 and a latch 7 is provided for fastening the top wall 3 in closed position. The interior of the chamber defined by walls 3, 4 and 5 is connected with an evacuating means by the outlet 8 and pipe and valve connections 9. The vacuum or suction box is supported in any convenient manner such as upon standards 10 which are arranged so as to permit ample space therebetween and beneath the vacuum box which is occupied by other parts of the apparatus.

The pulley band is supported in properly centered relation with respect to the vacuum box by the blocks 11 rotatably mounted as indicated at 12 upon standards 10 which support the vacuum box.

It is usual to provide apertures 2 which are slightly larger than the external diameter of the endless band so as to facilitate the insertion of the band into the vacuum box. However, the apertures 2 may be made of such dimension that when the endless band is inserted within the vacuum box the exterior of the band will contact with the edges defining the apertures so as to form a seal therewith. In those instances when the apertures 2 are made larger than the exterior diameter of the pulley band, some means for effecting a preliminary seal between the band and the margins of the apertures must be provided. This means may take any suitable form which may act either exteriorly or interiorly of the endless band. In the present instance a device acting interiorly of the endless band is provided and takes the form of the arcuately shaped presser shoes 13 carried upon piston rods 14 and operated by pistons 15 moving in cylinders 16 formed in the chuck 17. Fluid under pressure may be introduced into either end of cylinders 16 through flexible conduits 18 which lead to a source of pressure not shown. Upon the introduction of fluid under pressure in a manner such as to cause the shoes 13 to move outwardly the endless band is thrust into contact with the edges defining the apertures 2 so that upon evacuation of the chamber, the pressure of the atmosphere acting on the interior of the endless band forces the same into the chamber and causes it to take the shape shown in Fig. 3 which is the approximate shape of a tire casing. The chuck 17 is carried upon the upper end of a piston rod 18ª which is operated by a double acting piston moving in cylinder 19. Fluid under pressure may be introduced at either end of cylinder 19 through conduits 20 which lead to valve 21 and to a suitable source of pressure not shown. By actuation of the piston in the cylinder 19 the chuck 17 and parts carried thereby may be lowered into the position shown in Figs. 3 and 5 or raised into the position shown in Fig. 1 at the will of the operator.

Figure 3:
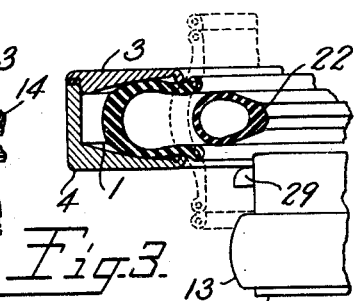
Figure 4:
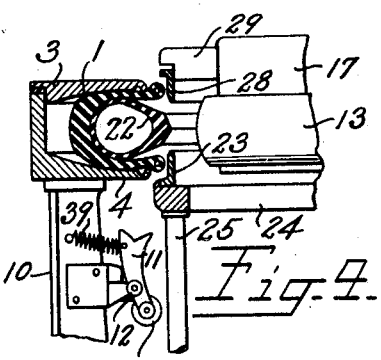
Figure 5:
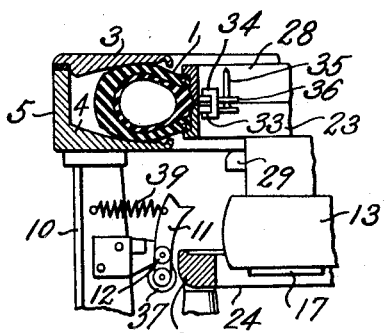
Figure 6:
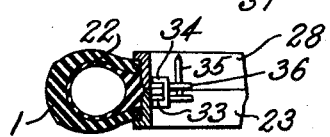

After the endless band has been forced into the shape shown in Fig. 3, the chuck 17 is lowered to the position shown in Figs. 3 and 5 so that a curing bag 22 may be inserted into the shaped band as shown in Figs. 3 and 4.

As will be apparent from the description so far, the steps of the process have consisted in shaping an endless band of tire elements into the form of a tire casing and inserting a curing bag within the casing. The next step in the method is to apply bead rings to the shaped casing containing the curing bag while the casing is held in tire form. The casing or band may be held in form by maintaining the interior of the chamber under reduced pressure or the curing bag may be relied upon to maintain the casing or shaped band within the chamber and in form. The particular mechanism according to this invention for performing the next step in the method is as follows:

The lower bead ring 23 is carried upon an annular support 24 which is fixed to the upper extremities of pistons 25 movable in cylinders 26 supplied with fluid under pressure from the pipe line 26ª. The annular support 24 is provided with the annular groove 27 which determines the position of the bead ring 23 thereon. The annular support 24 is so arranged relative to the other parts of the machine that when a bead ring is positioned thereon, the bead ring will be properly centered relative to the shaped band. Upon movement of the support 24 and bead ring 23 carried thereon in an upward direction as viewed in Fig. 1, the bead ring will be moved from the position shown in Fig. 1 to that shown in Figs. 4 and 5. In order to counteract the pressure exerted upon the shaped band as the bead ring 23 is moved thereagainst and also to apply the oppositely disposed bead ring 28 on to the opposite side of the shaped band, a plurality of arms 29 are slidably mounted in chuck 17. The arms are provided with cam followers 30 which ride in cam grooves in the manually operable cam 31. Upon rotation of the cam 31 the arms 29 are moved inwardly or outwardly in a radial direction with respect to the shaped band. When the arms are in their innermost position shown in Fig. 1 the chuck 17 may readily be moved through the shaped casing provided the shoes 13 are also in their innermost position. After the endless band has been shaped to the form shown in Fig. 4 the upper bead ring 28 is laid upon the upper bead of the tire casing. Upon movement of the chuck 17 through the tire casing into the position shown in Fig. 4 and upon manipulation of the cam 31, the arms 29 are moved into engagement with the bead ring 28. The arms 29 are provided with notched ends 32 which engage the bead ring 28 and properly center it with respect to the shaped band. Pressure is simultaneously introduced into the cylinders 26 and 19 in a manner such as to move the annular support 24 upwardly and to move the chuck 17 downwardly from the position shown in Fig. 1. This motion of the annular support 24 and chuck 17 causes the bead rings 23 and 28 to be moved together. During the course of movement of the bead rings 23 and 28 the bead portions of the tire casing or shaped band are brought into juxtaposition and the casing clamped about the curing bag in a manner to confine the bag within the casing. The bead rings 23 and 28 are provided with lugs 33 over which U-shaped clips 34 may be fitted to maintain the bead rings in clamped positions upon the shaped band and curing bag.

Inasmuch as the curing bag is provided with a valve through which the fluid under pressure may be introduced into it, the bead rings 23 and 28 are provided with notches adapted to register and to form an aperture through which the valve stem of the curing bag may project. In order that the notches in the bead rings 23 and 28 may properly register, the lugs 33 and 34 on the bead rings 23 and 28 respectively are provided with a pin 35 and apertured projection 36 which cooperate properly to adjust the bead rings so as to bring the notches therein in register with the valve of the curing bag when the bead rings are clamped together.

After the bead rings have been clamped upon the shaped endless band and curing bag contained therein, the arms 29 are withdrawn by manipulation of cam 31 and the chuck 17 and annular support 24 are both lowered to the position shown in Fig. 5 so as to remove any obstruction from the assembly of tire casing, curing bag, and bead rings. The suction or vacuum box is then opened by manipulating the top wall 3 and the assembly composed of the tire casing, curing bag therein and bead rings clamped thereon is removed therefrom as a unit and eventually inserted into a vulcanizing mold.

The blocks 11 which are provided for supporting the endless band 1 when it is first inserted into the vacuum box each are provided with a roller 37 which rides over the cam surface 38 formed on the annular support 24. When the annular support 24 is in the position shown in Fig. 1 the cam surface 38 moves the block 11 to the position adapted to support the endless band. When the annular support 24 is moved upwardly into a position such as shown in Fig. 4, the blocks 11 are moved out of the way, springs 39 being provided to effect such a motion.

The top wall 3 may be provided with a convenient counterweight 40, if desired, which aids in opening and closing the vacuum box.

While one form of apparatus has been described for carrying out the method of this invention, it is obvious that other mechanism may be employed for the same purpose, insofar as it is capable of performing the steps which consist of shaping an endless band of tire building material into the approximate shape of a tire casing permitting the insertion of a curing bag within the shaped band, and applying bead clamping elements upon the shaped band with the curing bag therein while the shaped band is held in tire form in the shaping apparatus.

While one form of the apparatus for forming this invention has been disclosed in detail, it is obvious that many variations in the non-essential details thereof may be made and that the essential parts thereof may be replaced by their equivalents such as will occur to one skilled in the art and which are contemplated as being within the scope of the present invention as defined by the following claims.

Having thus described my invention, what I claim and desire to protect by Letters Patent is:

1. In a bead ring applying machine in combination, a vacuum box for maintaining an endless band of tire elements in a shape approximately that of a tire casing, and means for clamping bead rings on to the band.

2. In tire manufacturing apparatus, in combination, suction means for expanding an endless band of tire elements into the approximate shape of a tire casing, and means for applying bead rings to the shaped band.

3. In tire manufacturing apparatus, in combination, means for arranging and maintaining an endless band of tire elements in the approximate shape of a tire casing, independent means engageable with bead rings for maintaining the bead rings in centered relation with the shaped band, the last mentioned means being movable axially of the band so as to move the bead rings into clamping relation with the shaped band.

4. In tire manufacturing apparatus, in combination, means for arranging and maintaining an endless band of tire elements in the approximate shape of a tire casing, arms movable radially of the band and adapted to engage a bead ring and to center the ring relative to the band, supporting means for the arms, means adapted to support another bead ring in centered relation to the band, and means for effecting relative movement between the supporting means and the last mentioned means axially of the band for clamping the bead rings together on the band.

5. In tire manufacturing apparatus, in combination, means for arranging and maintaining an endless band of tire elements in the approximate shape of a tire casing, a frame movable through the band, arms mounted on the frame for reciprocal movement radially of the band, said arms being arranged to engage and center a bead ring relative to the band when in outermost position, and being arranged to permit free movement through the band when in innermost position, a support for another bead ring, said support being movable axially of the band, and means for effecting relative movement of the frame and support to clamp the bead rings on to a shaped band.

6. In tire manufacturing apparatus, in combination, means for arranging and maintaining an endless band of tire elements in the approximate shape of a tire casing, a frame axially movable through the band, arms adjustable radially of the band carried by the frame for engaging a bead ring, a support for another bead ring axially movable relative to the band, means for effecting relative movement of the frame and support so as to clamp the bead rings on to the shaped band.

7. In tire building apparatus in combination, means for shaping and maintaining an endless band of tire elements approximately to the form of a tire casing, and means operable separately from the shaping means for mounting bead rings on the shaped band while held in shape by the first mentioned means.

8. In tire building apparatus in combination, a suction box for shaping an endless band of tire elements approximately to the form of a tire casing, and means for forcing a pair of bead rings axially toward the band while the latter is held in shape by the suction box.

9. In tire building apparatus in combination, a suction box for shaping an endless band of tire elements approximately to the form of a tire casing, a bead ring pressing member mounted for movement axially toward the suction box, and a set of bead ring clamping members mounted for movement through the shaped band.

10. In tire building apparatus in combination, means for shaping and supporting a U-shaped tire band with its bead portions unobstructed for the reception of a pair of bead rings, a set of bead ring clamping members movable through the band, means for moving the members into engagement with a bead ring, and a presser member adapted to engage a bead ring and to coact with the clamping members for applying the bead rings to the band.

11. In tire building apparatus in combination, means for shaping and supporting a tire casing, bead ring clamping members, means for moving the members through the casing and into engagement with a bead ring juxtaposed to a bead of the casing, and means for engaging another bead ring and cooperating with the members to clamp the bead rings on to the casing upon relative movement thereof.

12. An apparatus for use in the manufacture of tire casings comprising means employing a vacuum for forming an endless band into tire shape, and means for effecting the engagement of bead rings with the formed band at its inner circumference while said band is engaged by said forming means whereby the said formed band and the bead rings may be removed, a unit from said forming means.

13. An apparatus for use in the manufacture of tire casings comprising means employing a vacuum for forming an endless band into tire shape, and means for relatively moving oppositely disposed bead engaging elements into engagement with the formed band at the edge portions while said band is engaged by said forming means whereby said formed band and the bead ring engaging elements may be removed as a unit from said forming means.

14. An apparatus for use in the manufacture of tire casings comprising means employing a vacuum for forming an endless band into tire shape, and cooperating means for relatively moving the oppositely disposed bead ring engaging elements into engagement with the formed band at the edge portions while said band is engaged by said forming means whereby said formed band and its support may be removed as a unit from said forming means, one of said cooperating means being adapted to support its element during the forming operation.

15. An apparatus for use in the manufacture of tire casings comprising means employing a vacuum for forming an endless band into tire shape, a carrier for holding a bead ring, means for moving the carrier to bring the ring into engagement with an edge of the formed band and into juxtaposed relation with an oppositely disposed bead ring, while said band is engaged by said forming means whereby the formed band and bead rings may be removed as a unit from said forming means.

16. An apparatus for use in the manufacture of tire casings comprising means employing a vacuum for forming an endless band into tire shape, a carrier for holding a bead ring, means for moving the carrier to bring the bead ring into engagement with an edge of the formed band, and means for moving an oppositely disposed bead ring while engaging the opposite edge of the formed band toward the said first bead ring and into juxtaposed relation therewith while said band is engaged by said forming means whereby the formed band and bead ring may be removed as a unit from said forming means.

17. An apparatus for use in the manufacture of tire casings comprising means employing a vacuum for forming an endless band into tire shape, means for holding a bead ring in engagement with an edge of a formed band while said band is engaged by said forming means, arms for engaging and moving an oppositely disposed bead ring while engaging the opposite edge of the formed band towards the said first ring, and means for moving the said arms to bring their ring engaging portions to one side of the ring moved thereby to clear the same.

18. An apparatus for use in the manufacture of tire casings comprising means employing a vacuum for forming an endless band into tire shape, means for holding a bead ring in engagement with an edge of the formed band while said band is engaged by said forming means, arms, means for moving the arms radially outwardly and inwardly respectively to engage them with and disengage them from an oppositely disposed bead ring, and means for moving the arms axially of the band to move the ring engaged thereby toward the said first ring.

19. An apparatus for use in the manufacture of tire casings comprising means for employing a vacuum for forming an endless band into tire shape, a carrier for holding a bead ring for the formed band, means for moving the carrier to bring the bead ring into engagement with an edge of the formed band while said band is engaged by said forming means, arms, means for moving the arms radially outwardly and inwardly respectively to engage them with and disengage them from an oppositely disposed bead ring, and means for moving the arms to move the bead ring engaged thereby axially toward said first bead ring.

20. An apparatus for use in the manufacture of tire casings comprising a ring shaped forming chamber open at its inner circumference for engaging the outer circumference of an endless band, means for engaging the inner circumference of the band for temporarily holding the band against the inner circumference of said forming chamber, means for creating a vacuum in said chamber to effect a forming of the band to tire shape by forcing it into said chamber, and means for bringing bead engaging elements into engagement with the formed band at its inner circumference while said band is within said chamber whereby said formed band and the bead ring engaging elements may be removed as a unit from the apparatus.

21. An apparatus for use in the manufacture of tire casings comprising a ring shaped forming chamber open at its inner circumference for engaging the outer circumference of an endless band, radially reciprocatory means adapted when moved radially outward to engage the inner circumference of the band for temporarily holding the band against the inner circumference of said forming chamber, means for radially reciprocating the holding means, means for creating a vacuum in said chamber for effecting a forming of the band into tire shape by forcing it into said chamber, and means for bringing the bead rings into engagement with the formed band at its inner circumference while said band is within said chamber whereby said band and the bead rings may be removed as a unit from the apparatus.

22. An apparatus for use in the manufacture of tire casings comprising a ring shaped forming chamber open at its inner circumference for engaging the outer circumference of an endless band, radially reciprocatory means adapted when moved radially outward to engage the inner circumference of the band for temporarily holding the band against the inner circumference of said forming chamber, means for radially reciprocating said holding means, means for creating a vacuum in said chamber to effect a forming of the band into tire shape by forcing it into said chamber, means for holding a bead ring in engagement with an edge of the formed casing in said chamber, arms, actuating means for moving the arms radially outwardly and inwardly to respectively engage them with and disengage them from an oppositely disposed bead ring, and means for moving the arms axially for moving the bead ring engaged thereby toward the said first bead ring and for moving the arms and actuating means with said holding means axially beyond the formed band.

23. An apparatus for use in the manufacture of tire casings comprising a ring shaped openable forming chamber open at its inner circumference for engaging the outer circumference of an endless band, radially reciprocatory means adapted when moved radially outward to engage the inner circumference of the band for temporarily holding the band against the inner circumference of said chamber, pneumatically controlled means for radially reciprocating said holding means to active and inactive positions, means for creating a vacuum in said chamber to effect a forming of the band into tire shape by forcing it into said chamber, a carrier for holding a bead ring, pneumatically controlled means for reciprocating the carrier from inactive to active positions for bringing the bead rings into engagement with an edge of the formed band in said chamber, gauges for positioning the band relative to the chamber opening held in active positions by said carrier when said carrier is in inactive position, spring for automatically moving said gauges to inactive positions when released by said carrier when same is moved to active position, arms, actuating means for moving the arms radially outwardly and inwardly to respectively engage them with and disengage them from an oppositely disposed bead ring, and pneumatically controlled means for moving the arms axially to move the bead ring engaged thereby toward the said first bead ring and for moving the arms and actuating means with said holding means axially beyond the formed band whereby an unobstructed space may be provided before the portable support is assembled for permitting the free insertion into the cavity of the formed band of an expansible bag adapted to be supported by said portable support, said formed band, inflatable bag and bead rings locked together being movable as a unit from the apparatus upon the opening of the said chamber.

24. An apparatus for use in the manufacture of tire casings including a vacuum shaping chamber and means cooperating with the said chamber for clamping the bead portions of the tire casing while said casing is within said chamber.

25. An apparatus for use in the manufacture of tire casings including a chamber for shaping a tire casing by differential fluid pressure, and separately operable means associated with said chamber for clamping the beads of the tire casing while said casing is maintained in its chamber under said influence.

26. An apparatus for use in the manufacture of tire casings including a vacuum chamber for forming an endless band of tire elements into substantially tire shape, and means for moving bead clamping rings into engagement with the edge portions of said band while the band is in said chamber.

27. An apparatus for use in the manufacture of tire casings including a vacuum chamber for forming an endless band of tire elements into tire shape, and means for moving bead clamping rings into engagement with the edge portions of said band while it is in said chamber, portions of said moving means being shiftable to facilitate the introduction of a collapsible bag in the cavity of the shaped band before the clamping rings are applied.

28. An apparatus for use in the manufacture of tire casings including a vacuum chamber for forming an endless band into substantially tire shape and adapted to permit a curing bag to be inserted in the formed band while said band is supported in said chamber, and means for applying bead rings to the formed band in said chamber after the insertion of the said bag.

29. Tire forming apparatus comprising a suction box adapted to shape an endless band of tire building material approximately to tire form by suction, and means adapted relatively to force a pair of bead clamping rings axially toward the band while the latter lies within the suction box.

Signed at Detroit, county of Wayne, State of Michigan, this 24th day of June, 1929.

ADRIAN O. ABBOTT, Jr.